United States Patent [19]

Schwindt et al.

[11] 4,343,339

[45] Aug. 10, 1982

[54] PROCESS FOR THE PRODUCTION OF TIRES COMPRISING VULCANIZED ELASTOMERS CONTAINING URETHANE GROUPS

[75] Inventors: Jürgen Schwindt; Otto Ganster; Hans-Joachim Meiners, all of Leverkusen, Fed. Rep. of Germany

[73] Assignee: Bayer Aktiengesellschaft, Leverkusen, Fed. Rep. of Germany

[21] Appl. No.: 189,496

[22] Filed: Sep. 22, 1980

Related U.S. Application Data

[63] Continuation of Ser. No. 69,452, Aug. 24, 1979, abandoned.

[30] Foreign Application Priority Data

Sep. 6, 1978 [DE] Fed. Rep. of Germany ....... 2838756

[51] Int. Cl.$^3$ ...................... C08G 18/82; C08G 18/62; B60C 1/00
[52] U.S. Cl. .................................. 152/209 R; 528/61; 528/64; 528/75; 528/44; 528/503; 152/330 R
[58] Field of Search .................. 528/61, 64, 75, 503

[56] References Cited

U.S. PATENT DOCUMENTS

| | | | |
|---|---|---|---|
| 3,427,366 | 2/1969 | Verdol et al. | 260/859 |
| 3,457,234 | 7/1969 | Gianatasio | 260/75 |
| 3,607,976 | 9/1971 | Hsieh et al. | 260/859 |
| 3,701,374 | 10/1972 | McGillivary | 528/64 |
| 3,714,110 | 1/1973 | Verdol et al. | 260/33.6 AQ |
| 3,855,177 | 12/1974 | Sanda | 528/61 |
| 3,897,400 | 7/1975 | Finelli | 528/64 |
| 4,053,446 | 10/1977 | Watabe et al. | 528/61 |
| 4,104,265 | 8/1978 | deZarauz | 528/75 |

FOREIGN PATENT DOCUMENTS 2510703 9/1976 Fed. Rep. of Germany .
1145338 3/1969 United Kingdom .

*Primary Examiner*—H. S. Cockeram
*Attorney, Agent, or Firm*—Gene Harsh; Joseph C. Gil

[57] ABSTRACT

The instant invention is directed to a process for the production of vulcanized elastomers containing urethane groups by casting, comprising:

(A) mixing the following components:
  (1) liquid diene polymers containing isocyanate reactive functional groups,
  (2) compounds having molecular weights of from 400 to 10,000, and containing at least two hydroxyl groups,
  (3) polyisocyanates,
  (4) cross-linking agents having molecular weights of from 32 to 400 and containing at least two active hydrogen atoms,
  (5) vulcanization agents used for vulcanization and optionally
  (6) reinforcing fillers; and subsequently
(B) pouring the mixture into a mold and allowing the mixture to react in the mold; and subsequently
(C) vulcanizing the molded product at temperatures above 120° C.

13 Claims, No Drawings

PROCESS FOR THE PRODUCTION OF TIRES COMPRISING VULCANIZED ELASTOMERS CONTAINING URETHANE GROUPS

This is a continuation, of application Ser. No. 69,452 filed Aug. 24, 1979 and now abandoned.

BACKGROUND OF THE INVENTION

This invention relates to vulcanized elastomers containing urethane groups produced by the casting process, and to a process for producing the same.

It has already been disclosed in German Auslegeschrift No. 2,602,495 (U.S. Pat. No. 4,104,265), that elastomeric molded products can be produced from liquid diene polymers which contain functional groups, reinforcing fillers, chain lengthening agents (such as isocyanates or amines) and vulcanizing agents, optionally in the presence of polyethers or polyesters, by vulcanizing the mixture of the abovementioned components, first at temperatures from 20° to 125° C. and then, in a second stage, at temperatures above 140° C.

The liquid diene polymers used in this process must have a degree of functionality of from 1.8 to 2.0. The use of diene polymers having such a degree of functionality is a disadvantage because these polymers are generally difficult to obtain since they are usually prepared by a relatively complicated anionic polymerization.

Moreover, the elastomers obtained according to the above-mentioned German Auslegeschrift still have so little structural stability after chain lengthening that vulcanization must be carried out in the same mold.

Another disadvantage of the known process is that the components must be mixed together by means of rollers as in the case of rubbers, which entails a high consumption of energy.

DESCRIPTION OF THE INVENTION

The instant invention relates to a process for the production of vulcanized elastomers containing urethane groups in which the disadvantages of the known processes are obviated. According to the present invention, a mixture consisting of a liquid diene polymer, a relatively high molecular polyol and a cross-linking agent (e.g. an amine), vulcanizing agents and auxiliaries very finely dispersed therein, and optionally reinforcing fillers (e.g., carbon black, Aerosil), are reacted with a polyisocyanate by the casting process in a mold.

The molded article (even before vulcanization) has reacted so completely in a short period of time (less than 5 minutes) that it can be removed from the mold. Subsequent vulcanization at temperatures above 120° C. produces a marked improvement in the mechanical properties of the molded article.

This invention relates to a process for the production of vulcanized elastomers containing urethane groups by casting, comprising:

(A) mixing the following components:
 (1) liquid diene polymers containing isocyanate reactive functional groups,
 (2) compounds having molecular weights of from 400 to 10,000, and containing at least two hydroxyl groups,
 (3) polyisocyanates,
 (4) cross-linking agents having molecular weights of from 32 to 400 and containing at least two active hydrogen atoms,
 (5) vulcanization agents used for vulcanization and optionally
 (6) reinforcing fillers; and subsequently
(B) pouring the mixture into a mold and allowing the mixture to react in the mold; and subsequently
(C) vulcanizing the molded product at temperatures above 120° C.

The components (1), (2) and (4) (which have isocyanate-reactive hydrogen atoms) are preferably reacted with the polyisocyanates at indices at from 80 to 120, most preferably from 100 to 110.

Components (1) and (2) are generally present in such proportions that the mixture contains from 20 to 80 parts by weight, preferably from 20 to 60 parts by weight of component (1) to from 80 to 20 parts by weight, preferably from 80 to 40 parts by weight of component (2).

Component (4) is generally used in quantities of from 3 to 30% by weight, preferably from 5 to 20% by weight, based on 100 parts by weight of component (1) plus component (2).

The process according to the present invention is surprisingly found to have the following advantages:

1. The functionality of the liquid diene polymers which may be used is not limited to the range of from 1.8 to 2.0. In fact, the relatively inexpensive commercially available liquid diene polymers which are obtained by radical polymerization (preferably having an average degree of functionality of 2.4) may be used.
2. The viscosity of the mixture of starting materials may be so low that the mixture can be handled by the casting process.
3. The resulting elastomers containing urethane groups have such a high structural stability even before vulcanization that they can be removed from the mold; and, vulcanization, which even further improves the mechanical properties of the molded article, can take place outside the mold.
4. The process according to the invention provides a marked saving in energy (by use of the casting process and eliminating the need for mixing by rolling) and a drastic reduction in the number of molds required for the final finishing of the product.

The starting products (1) used according to the invention are liquid diene polymers having a molecular weight of generally from 500 to 30,000 and preferably from 1000 to 10,000. They contain, as functional groups, carboxyl, amino, hydroxyl and/or thiol groups or halogen atoms, preferably hydroxyl groups, and generally have a functionality of from 2 to 3. Their hydrocarbon chain consists of a homopolymer of conjugated dienes or of a copolymer of conjugated dienes either with each other or with aromatic vinyl compounds. For example, it may consist of polybutadiene, polyisoprene, polypiperylene, polychloroprene, polypentadiene, the copolymers of butadiene and styrene, butadiene and isoprene, styrene and isoprene, butadiene or isoprene and vinyl naphthalene. Further, the chain may be substituted by alkyl or alkoxy groups or halogens. The hydrocarbon chain of the prepolymer may also consist of a copolymer of a conjugated diene with a compound from the group of vinyl nitriles, e.g. a copolymer of butadiene or isoprene with acrylonitrile or methacrylonitrile; or it may consist of a terpolymer of conjugated dienes, either with each other or with aromatic vinyl compounds and/or with vinyl nitriles. The monomer units in the chain, which are either statistically distributed or attached as blocks, and the proportions of monomers are variable. Mixtures of several diene polymers may also be used according to the present invention.

Among the liquid diene polymers, the following are particularly preferred according to the present invention: polybutadienols and copolymers of styrene and/or acrylonitrile with butadiene which have functional groups, e.g. OH groups.

The functionality of the liquid diene polymer is determined by measuring the number average molecular weight by means of vapour pressure osmometry and OH-number.

The starting components (2) include compounds having a molecular weight of generally from 400 to 10,000 which have at least two hydroxyl groups, in particular from 2 to 8 hydroxyl groups, especially those having a molecular weight of from 1000 to 8000, preferably from 1500 to 8000. Examples of such compounds are polyesters, polyethers, polythioethers, polyacetals, polycarbonates and polyester amides having at least 2, generally from 2 to 8, preferably from 2 to 4 hydroxyl groups, such as the hydroxyl compounds already known for the preparation of polyurethanes.

(a) The polyesters having hydroxyl groups used as starting materials may be, for example, reaction products of polyhydric (preferably dihydric) alcohols, optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated.

The following are examples of such carboxylic acids and their derivatives: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids optionally mixed with monomeric fatty acids (such as oleic acid), dimethyl terephthalate and terephthalic acid-bis-glycol esters. The following are examples of suitable polyvalent alcohols: ethylene glycol, propylene glycol-(1,2) and -(1,3), butylene glycol-(1,4) and -(2,3), hexanediol-(1,6), octanediol-(1,8), neopentylglycol, 1,4-bis-hydroxymethylcyclohexane, 2-methyl-1,3-propanediol, glycerol, trimethylolpropane, hexanetriol-(1,2,6), butanetriol-(1,2,4), trimethylolethane, pentaerythritol, quinitol, mannitol, sorbitol, formitol, methylglycoside, diethylene glycol, triethylene glycol, tetraethylene glycol and higher polyethylene glycols, dipropylene glycol and higher polypropylene glycols, and dibutylene glycol and higher polybutylene glycols. The polyesters may also contain a proportion of carboxyl end groups. Polyesters of lactones (such as ε-caprolactone) or hydroxycarboxylic acids (such as ω-hydroxycaproic acid) may also be used.

(b) The polyethers used according to the present invention which have at least 2, generally from 2 to 8 and preferably 2 or 3 hydroxyl groups are also known per se. They are prepared, for example, by the polymerization of epoxides such as ethylene oxide, propylene oxide, butylene oxide, tetrahydrofuran, styrene oxide or epichlorohydrin. The polymerization of the epoxides may be either each on its own (e.g. in the presence of Lewis catalysts such as $BF_3$), or by addition of these epoxides (preferably ethylene oxides and propylene oxide), optionally as mixtures or successively, to starting components having reactive hydrogen atoms. Compounds having reactive hydrogen atoms which may be used include water, alcohols, ammonia or amines, e.g. ethylene glycol, propylene glycol-(1,3) or -(1,2), trimethylolpropane, glycerol, sorbitol, 4,4'-dihydroxydiphenylpropane, aniline, ethanolamine or ethylene diamine. Sucrose polyethers may also be used according to the present invention, e.g. those described in German Auslegeschriften Nos. 1,176,358 and 1,064,938 as well as polyethers started on formitol or formose (German Offenlegungsschriften 2,639,083 and 2,737,951). In many cases it is preferred to use polyethers which contain predominantly primary oH groups (up to 90% by weight, based on all the OH groups present in the polyether).

(c) Preferred among the polythioethers are the condensation products obtained by reacting thiodiglycol on its own and/or with other glycols, dicarboxylic acids, formaldehyde, aminocarboxylic acids or amino-alcohols. The products obtained are polythio mixed ethers, polythioether esters or polythioether ester amides, depending n the co-components.

(d) Suitable polyacetals include, for example, the compounds which can be prepared from glycols such as diethylene glycol, triethylene glycol, 4,4'-dioxethoxy-diphenyl dimethylmethane, hexanediol and formaldehyde. Suitable polyacetals for the purpose of the present invention may also be prepared by the polymerization of cyclic acetals, e.g. trioxane (German Offenlegungsschrift No. 1,694,128).

(e) The polycarbonates having hydroxyl groups used may be of the kind known per se, for example those which can be prepared by the reaction of diols (such as propanediol-(1,3), butanediol-(1,4) and/or hexanediol-(1,6), diethylene glycol, triethylene glycol, tetraethylene glycol or thiodiglycol) with diarylcarbonates (e.g. with diphenyl-carbonate) or phosgene (German Auslegeschriften Nos. 1,694,080; 1,915,908 and 2,221,751; and German Offenlegungschrift 2,605,024).

(f) Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

(g) Polyhydroxyl compounds already containing urethane or urea groups and modified or unmodified natural polyols such as castor oil, carbohydrates or starch may also be used. Addition products of alkylene oxides and phenol formaldehyde resins or of alkylene oxides and urea formaldehyde resins are also suitable for the purpose of the present invention.

(h) The above-mentioned polyhydroxyl compounds may be modified in various ways before they are used in the polyisocyanate polyaddition process.

According to German Offenlegungsschriften No. 2,210,839 (U.S. Pat. Nos. 3,849,515) and 2,544,195, for example, a mixture of various polyhydroxyl compounds (e.g. of a polyether polyol and a polyester polyol) may be condensed by etherification in the presence of a strong acid to form a higher molecular polyol built up of various segments connected by ether bridges. Moreover, amide groups may be introduced into the polyhydroxyl compounds (German Offenlegungsschrift No. 2,559,372) or triazine groups may be introduced by a reaction with polyfunctional cyanic acid esters (German Offenlegungsschrift No. 2,620,487). Polyhydroxyl compounds containing guanidine, phosphonoformamidine or acylurea groups may be obtained by the reaction of a polyol with a less than equivalent quantity of a diisocyanatocarbodiimide, followed by reaction of the carbodiimide group with an amine, amide, phosphite or carboxylic acid (German Offenlegungsschriften Nos. 2,714,289, 2,714,292 and 2,714,293). It is in some cases of particular interest to convert the higher molecular polyhydroxyl compound partly or completely into the corresponding anthranilic acid esters by reaction with isatoic acid anhydride (German Offenlegungsschriften Nos. 2,019,432 and 2,619,840 and U.S. Pat. Nos. 3,808,250, 3,975,428 and 4,016,143). Relatively high molecular compounds containing aromatic amino end groups are obtained in this way.

According to German Offenlegungsscrift No. 2,546,536 and U.S. Pat. No. 3,865,791, relatively high molecular compounds containing amino end groups are obtained by the reaction of isocyanate prepolymers with hydroxyl-containing enamines, aldimines or ketimines followed by hydrolysis. Other methods of preparation for relatively high molecular compounds containing amino end groups or hydrazide end groups are described in German Offenlegungsschrift No. 1,694,152 (U.S. Pat. No. 3,625,871).

(i) Polyhydroxyl compounds which contain high molecular polyadducts or polycondensates or polymers in a finely dispersed or dissolved form may also be used according to the present invention. Polyhydroxyl compounds of this type may be obtained, for example, by carrying out polyaddition reactions (e.g. reactions between the polyisocyanates and aminofunctional compounds) or polycondensation reactions (e.g. between formaldehyde and phenols and/or amines) in situ in the above-mentioned hydroxyl compounds. Processes of this kind have been described, for example, in German Auslegeschriften Nos. 1,168,075 and 1,260,142 and in German Offenlegungsschriften Nos. 2,324,134, 2,423,984, 2,512,385, 2,513,815, 2,550,796, 2,550,797, 2,550,833, 2,550,862, 2,633,293 and 2,639,254. Polyhydroxyl compounds of this kind may also be obtained according to U.S. Pat. No. 3,869,413 or German Offenlegungsschrift No. 2,550,860 by mixing a previously prepared aqueous polymer dispersion with a polyhydroxyl compound and then removing water from the mixture.

Polyhydroxyl compounds which are modified with vinyl polymers, e.g. the compounds obtained by the polymerization of styrene and acrylonitrile in the presence of polyethers (U.S. Pat. Nos. 3,383,351, 3,304,273, 3,523,093 and 3,110,695 and German Auslegeschrift No. 1,152,536) or polycarbonate polyols (German Patent No. 1,769,795 and U.S. Pat. No. 3,637,909) are also suitable for the process of the present invention. The use of polyether polyols which have been obtained according to German Offenlegungsschriften No. 2,442,101, 2,644,922 and 2,646,141 by graft polymerization with vinyl phosphonic acid esters and optionally (meth)acrylonitrile, (meth)acrylamide or OH functional (meth-)acrylic acid esters gives rise to synthetic resin products which have exceptionally high flame resistance. Polyhydroxyl compounds in which carboxyl groups have been introduced by radical graft polymerization with unsaturated carboxylic acids and optionally other olefinically unsaturated monomers (German Offenlegungsschriften Nos. 2,714,291, 2,739,620 and 2,654,746) are particularly advantageous to use in combination with mineral fillers.

When modified polyhydroxyl compounds of the type mentioned above are used as starting components in the polyisocyanate polyaddition process, polyurethane resins which have substantially improved mechanical properties are obtained in many cases.

Representatives of the above-mentioned compounds to be used according to the present invention have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich 1966, e.g. on pages 45–71. Mixtures of the above-mentioned compounds having at least two isocyanate-reactive hydrogen atoms and a molecular weight of from 400 to 10,000 may be course, also be used, e.g. mixtures of polyethers and polyesters.

It is particularly advantageous in some cases to combine low melting with high melting polyhydroxyl compounds (German Offenlegungsschrift No. 2,706,297).

The following are also used for carrying out the process according to the present invention:

The polyisocyanates which may be used, component (3) include aliphatic, cycloaliphatic, araliphatic, aromatic and heterocyclic polyisocyanates, e.g. as described by W. Siefken in Justus Liebigs Annalen der Chemie, 562, pages 75 to 136. Examples include those corresponding to the following general formula:

wherein n represents 2–4, preferably 2, and

Q represents an aliphatic hydrocarbon group having from 2–18, preferably from 6–10 carbon atoms, a cycloaliphatic hydrocarbon group having from 4–15, preferably from 5–10 carbon atoms, an aromatic hydrocarbon group having from 6–15, preferably from 6–13 carbon atoms or an araliphatic hydrocarbon group having from 8–15, preferably from 8–13 carbon atoms. Examples are ethylene diisocyanate, 1,4-tetramethylene diisocyanate, 1,6-hexamethylenediisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (German Auslegeschrift No. 1,202,785 and U.S. Pat. No. 3,401,190), 2,4- and 2,6-hexahydrotolylene diisocyanate and any mixtures of these isomers, hexahydro1,3- and/or -1,4-phenylene-diisocyanate, perhydro-2,4' and/or 4,4'-diphenylmethane-diisocyanate, 1,3- and 1,4-phenylene-diisocyanate, 2,4- and 2,6-tolylene diisocyanate and any mixtures of these isomers, diphenyl methane-2,4'- and/or 4,4'-diisocyanate and naphthylene-1,5-diisocyanate.

The following, for example, may also be used according to the present invention: triphenylmethane-4, 4', 4''-triisocyanate, polyphenyl-polymethylene polyisocyanates which may be obtained by aniline/formaldehyde condensation followed by phosgenation (British Patents 874,430 and 848,671), m- and p-isocyanatophenylsulfonylisocyanates (U.S. Pat. No. 3,454,606), perchlorinated aryl polyisocyanates (German Auslegeschrift No. 1,157,601 or U.S. Pat. No. 3,277,138), polyisocyanates having carbodiimide groups (German Pat. No. 1,092,007 or U.S. Pat. No. 3,152,162 and German Offenlegungsschriften Nos. 2,504,400, 2,537,685 and 2,552,350), norbornane diisocyanate (U.S. Pat. No. 3,492,330), polyisocyanates having allophanate groups (British Pat. No. 994,890, Belgian Pat. No. 761,626 and Dutch patent application No. 7,102,524), polyisocyanates having isocyanurate groups (U.S. Pat. No. 3,001,973, German Pat. Nos. 1,022,789, 1,222,067 and 1,027,394 and German Offenlegungsschriften Nos. 1,929,034 and 2,004,048), polyisocyanates having urethane groups (Belgian Pat. No. 752,261 or U.S. Pat. Nos. 3,394,164 and 3,644,457), polyisocyanates having acylated urea groups (German Pat. No. 1,230,778), polyisocyanates having biuret groups (U.S. Pat. Nos. 3,124,605, 3,201,372 and 3,124,605 and in British Pat. No. 889,050), polyisocyanates prepared by telomerization reactions (U.S. Pat. No. 3,654,106), polyisocyanates having ester groups (British Pat. Nos. 965,474 and 1,072,956, U.S. Pat. No. 3,567,763 and German Pat. No. 1,231,688), reaction products of the above-mentioned isocyanates with acetals (German Pat. No. 1,072,385) and polyisocyanates containing polymeric fatty acid esters (U.S. Pat. No. 3,455,883).

The distillation residues obtained from the commercial production of isocyanates and still containing isocyanate groups may also be used, optionally dissolved in one or more of the above-mentioned polyisocyanates. Any mixtures of the above-mentioned polyisocyanates may, of course, also be used.

As a rule, it is particularly preferred to use commercially readily available polyisocyanates, e.g. 2,4- and 2,6-tolylene diisocyanates and any mixtures of these isomers ("TDI"), polyphenyl-polymethylene polyisocyanates which may be obtained by aniline/formaldehyde condensation followed by phosgenation ("crude MDI") and polyisocyanates containing carbodiimide groups, urethane groups, allophanate groups, isocyanurate groups, urea groups or biuret groups ("modified polyisocyanates"), particularly those modified polyisocyanates which are derived from 2,4- and/or 2,6-tolylene diisocyanate or from 4,4'- and/or 2,4'-diphenylmethane diisocyanate.

The cross-linking compounds having at least two isocyanate-reactive hydrogen atoms and a molecular weight of from 32 to 400, component (4) are preferably compounds containing hydroxyl and/or amino groups and/or thiol groups and/or carboxyl groups, preferably hydroxyl groups and/or amino groups. They generally have from 2 to 8, preferably from 2 to 4 isocyanate-reactive hydrogen atoms.

These again may be used as mixtures of various compounds containing at least two isocyanate-reactive hydrogen atoms and having a molecular weight of from 32 to 400.

The following are mentioned as examples of such compounds: ethylene glycol, propylene glycol-(1,2) and -(1,3), butylene glycol-(1,4) and -(2,3), pentanediol-(1,5), hexanediol-(1,6), octanediol-(1,8), neopentylglycol, 1,4-bis-hydroxymethylcyclohexane, 2-methyl-1,3-propanediol, dibromobutenediol (U.S. Pat. No. 3,723,392), glycerol, trimethylolpropane, hexanetriol-(1,2,6), trimethylolethane, pentaerythritol, quinitol, mannitol, sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxy-diphenylpropane, dihydroxymethylhydroquinone, ethanolamine, diethanolamine, N-methyl-diethanolamine, triethanolamine and 3-aminopropanol.

The low molecular weight polyols used according to the present invention may also be mixtures of hydroxyaldehydes and hydroxyketones ("formose") or the polyhydroxyalcohols ("formitol") obtained from them by reduction. Examples include the compounds produced by the autocondensation of formaldehyde hydrate in the presence of metal compounds as catalysts and compounds capable of enediol formation as co-catalysts (German Offenlegungsschriften Nos. 2,639,084, 2,714,084, 2,714,104, 2,721,186, 2,738,154 and 2,738,512). It is advantageous to use these formoses in combination with aminoplast formers and/or phosphites to produce synthetic materials which have improved flame resistance (German Offenlegungsschriften Nos. 2,738,513 and 2,738,532). Solutions of polyisocyanate polyaddition products, in particular of polyhydrazodicarbonamides and/or polyurethane ureas which have ionic groups, in low molecular weight polyhydric alcohols may also be used as polyol components according to the present invention (German Offenlegungsschrift No. 2,638,759).

Examples of suitable aliphatic diamines for the process according to the present invention include ethylene diamine, 1,4-tetramethylene-diamine, 1,11-undecamethylene-diamine, 1,12-dodecamethylene-diamine and mixtures thereof, 1-amino-3,3,5-trimethyl-5-aminomethylcyclohexane ("isophoronediamine"), 2,4- and 2,6-hexahydrotolylenediamine and mixtures thereof, perhydro-2,4'- and 4,4'-diaminodiphenylmethane, p-xylylenediamine, bis-(3-aminopropyl)methylamine, diamino-perhydroanthracenes (German Offenlegungsschrift No. 2,638,731) and cycloaliphatic triamines (German Offenlegungsschrift No. 2,614,244). Hydrazine and substituted hydrazines (e.g. methyl hydrazine, N,N'-dimethylhydrazine and their homologues) and acid dihydrazides may also be used according to the invention. Examples of acid dihydrazides include carbodihydrazide, oxalic acid dihydrazide, the dihydrazides of malonic acid, succinic acid, glutaric acid, adipic acid, β-methyladipic acid, sebacic acid, hydracrylic acid and terephthalic acid. Semicarbazidoalkylene-hydrazides, e.g. β-semicarbazidopropionic acid hydrazide (German Offenlegungsschrift No. 1,770,591), semicarboazido-alkylene-carbazic esters, e.g. 2-semicarbazidoethyl-carbazic ester (German Offenlegungsschrift No. 1,918,504) or amino-semicarbazide compounds, e.g. β-aminoethyl-semicarbazido-carbonate (German Offenlegungsschrift No. 1,902,931)

may also be used. The amino groups may be partly or completely blocked by aldimine or ketimine groups to control their reactivity (U.S. Pat. No. 3,734,894 and German Offenlegungsschrift No. 2,637,115).

The following are examples of aromatic diamines: bis-anthranilic acid esters (German Offenlegungsschriften Nos. 2,040,644 and 2,160,590), 3,5- and 2,4-diamino-benzoic acid esters (German Offenlegungsschrift No. 2,025,900), diamines having ester groups (German Offenlegungsschriften Nos. 1,803,635, 2,040,650, and 2,160,589 or U.S. Pat. Nos. 3,681,290 and 3,736,350), diamines having ether groups (German Offenlegungsschriften Nos. 1,770,525 and 1,809,172 or U.S. Pat. Nos. 3,654,364 and 3,736,295), 2-halogen-1,3-phenylenediamine optionally substituted in the 5-position (German Offenlegungsschriften Nos. 2,001,772, 2,025,896 and 2,065,869), 3,3'-dichloro-4,4'-diaminodiphenylmethane, tolylene diamine, 4,4'-diaminodiphenylmethane, 4,4'-diaminodiphenyldisulfides (German Offenlegungsschrift No. 2,404,976); diaminodiphenyl dithioether (German Offenlegungsschrift No. 2,509,404), aromatic diamines substituted with alkylthio groups (German Offenlegungsschrift No. 2,638,760), diamino-benzene phosphonic acid esters (German Offenlegungsschrift No. 2,459,491), aromatic diamines containing sulfonate or carboxylate groups (German Offenlegungsschrift No. 2,720,166) and high melting diamines (German Offenlegungsschrift No. 2,635,400). The aminoalkylthioaniline mentioned in German Offenlegungsschrift No. 2,734,574 are examples of aliphatic aromatic diamines.

Aromatic diamines which have at least one alkyl substituent in the ortho-position to the amino group, preferably an alkyl substituent having from 1 to 3 carbon atoms, are particularly suitable for the process according to the present invention. The following are examples: 1,3-diethyl-2,4-diaminobenzene, 2,4-diaminomesitylene, 1-methyl-3,5-diethyl-2,4-diaminobenzene, 1-methyl-3,5-triethyl-2,6-diamino benzene, 1,3,5-triethyl-2,6-diaminobenzene and 3,5,3',5'-tetraethyl-4,4'-diaminodiphenylmethane.

Diamines corresponding to the following general formula:

wherein R represents hydrogen or an alkyl group, preferably one having from 1 to 3 carbon atoms, which must be present at least once, may also be used according to the present invention.

The above-mentioned aromatic diamines may, of course, also be used as mixtures or in combination with other diamines, preferably aromatic diamines.

The use of 1-methyl-3,5-diethyl-2,4-diaminobenzene or a mixture of this compound with 1-methyl-3,5-diethyl-2,6-diaminobenzene is particularly preferred.

The chain lengthening agents used according to the present invention may also be compounds such as 1-mercapto-3-aminopropane, substituted or unsubstituted amino acids (e.g. glycine, alanine, valine, serine or lysine), and substituted or unsubstituted dicarboxylic acids (for example, succinic acid, adipic acid, phthalic acid, 4-hydroxy-phthalic acid or 4-aminophthalic acid).

Compounds which are monofunctional in their reaction with isocyanates may also be included as so-called chain breakers in amounts of from 0.01 to 10% by weight, based on the polyurethane solid content. Examples of such monofunctional compounds include monoamines (such as butylamine and dibutylamine, octylamine, stearylamine, N-methylstearylamine, pyrrolidine, piperidine and cyclohexylamine), monohydric alcohols (such as butanol, 2-ethylhexanol, octanol and dodecanol) and the various amyl alcohols (cyclohexanol and ethylene glycol monoethylether).

Low molecular weight polyols having molecular weight of up to 400 which are suitable according to the present invention also include ester diols corresponding to the following general formulae:

$$HO-(CH_2)_x-CO-O-(CH_2)_y-OH$$

and $$HO-(CH_2)_x-O-CO-R-CO-O-(CH_2)_x-OH$$

wherein

R represents an alkylene group having from 1 to 10, preferably from 2 to 6 carbon atoms or a cycloalkylene or arylene group having from 6 to 10 carbon atoms, x represents 2 to 6 and y represents 3 to 5.

Some examples are δ-hydroxybutyl-ε-hydroxy-caproic acid ester, ω-hydroxyhexyl-γ-hydroxybutyric acid ester; adipic acid-bis-(β-hydroxyethyl)-ester and terephthalic acid-bis-(β-hydroxyethyl)-ester.

Diolurethanes corresponding to the following general formula may also be used:

$$HO-(CH_2)_x-O-CO-NH-R'-NH-CO-O-(CH_2)_x-OH$$

wherein

R' represents an alkylene group having from 2 to 15, preferably 2 to 6 carbon atoms or a cycloalkylene or arylene group having from 6 to 15 carbon atoms and x represents an integer of from 2 to 6. Examples are 1,6-hexamethylene-bis-(β-hydroxyethylurethane) and 4,4'-diphenylmethane-bis-(δ-hydroxybutylurethane).

Diol ureas may be used corresponding to the following general formula:

$$HO-(CH_2)_x-\underset{R'''}{N}-CO-NH-R''-NH-CO-\underset{R'''}{N}-(CH_2)_x-OH$$

wherein

R'' represents an alkylene group having from 2 to 15, preferably 2 to 9 carbon atoms or a cycloalkylene or arylene group having from 6 to 15 carbon atoms, R''' represents hydrogen or a methyl group and x represents 2 or 3, e.g. 4,4'-diphenylmethane-bis(β-hydroxyethylurea). The compound corresponding to the following formula may be used:

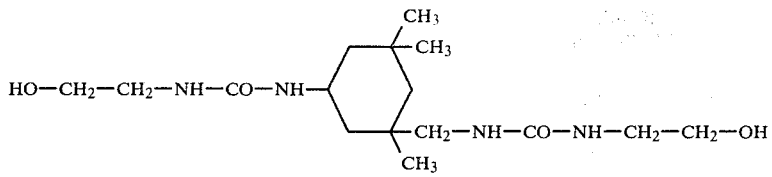

For some purposes, it is advantageous to use polyols containing sulfonate and/or phosphonate groups (German Offenlegungsschrift No. 2,719,372), preferably the product of addition of a bisulfite to butenediol-1,4 or its alkoxylation products.

The term "vulcanizing agents", component (5), means not only the substances strictly denoted by this term, such as sulfur or the peroxides, but also the usual vulcanization accelerators. As vulcanization accelerators there are used either compounds which are inactive towards the bifunctional chain lengthening agents or compounds which are normally reactive with the chain lengthening agent at the polyaddition or polycondensation temperature but have been rendered inactive by suitable means, e.g. encapsulation. All the conventional substances may therefore be used, such as primary or secondary amines; sulfenamides or mercaptobenzothiazole, in particular N-di-isopropyl-mercaptobenzothiazole-sulfenamide and N-dicyclohexyl-mercaptobenzothiazylsulphenamide; sulfenamides of thiocarboxylic acids, e.g. the N-morpholino-sulfenamide of N-morpholinothio-carboxylic acid; phosphorylated compounds, e.g. the bisulfide of bis-(diisopropyl-thiophosphoryl), the trisulfide of bis-(diethylthiophosphoryl) and zinc-dibutyl-dithiophosphate; guanidines; and mercaptotriazines, e.g. 4,4'-disulfide of bis-(2-N-ethylamine-6-N-diethylamine-1,3,5-triazine). Zinc-N-diethyldithiocarbamate may also be used and is preferred.

Suitable polyaddition catalysts may also be added while the process is carried out.

The reinforcing fillers, component (6), used are the materials used, for example, in the manufacture of pneumatic tires, such as carbon black, silica, metallic reinforcing elements, glass, plasticizers and/or extender oils. These fillers should be dispersed very homogeneously in the functional liquid polymer when carrying out the process.

The following auxiliary agents and additives may also be used according to the present invention: Known catalysts, e.g. tertiary amines such as triethyl-amine, tributylamine, N-methyl-morpholine, N-ethyl-morpholine, N,N,N',N'-tetramethyl-ethylenediamine, pentamethyldiethylenetriamine and higher homologues (German Offenlegungsschriften Nos. 2,624,527 and 2,624,528), 1,4-diazabicyclo(2,2,2)-octane, N-methyl-N'-dimethylaminoethylpiperazine, bis-(dimethylaminoalkyl)-piperazine (German Offenlegungsschrift No. 2,636,787), N,N-dimethylbenzylamine, N,N-dimethylcyclohexylamine, N,N-diethylbenzylamine, bis-(N,N-diethylaminoethyl)-adipate, N,N,N',N'-tetramethyl-1,3-butanediamine, N,N-dimethyl-β-phenylethylamine, 1,2-dimethylimidazole, 2-methylimidazole, monocyclic and bicyclic amidines (German Offenlegungsschrift No. 1,720,633), bis-(dialkylamino) alkylethers (U.S. Pat. No. 3,330,782, German Auslegeschrift No. 1,030,558, German Offenlegungsschriften No. 1,804,361 and 2,618,280) and tertiary amines having amide groups (preferably formamide groups) according to German Auslegeschriften Nos. 2,523,633 and 2,732,292. Known Mannich bases of secondary amines (such as dimethylamine and aldehydes, preferably formaldehyde), ketones (such as acetone, methyl ethyl ketone or cyclohexanone) and phenols (such as phenol, nonylphenol or bisphenol) may also be used as catalysts.

Examples of tertiary amines having isocyanate-reactive hydrogen atoms which may be used as catalysts include triethanolamine, triisopropanolamine, N-methyldiethanolamine, N-ethyl-diethanolamine, N,N-dimethylethanolamine, their reaction products with alkylene oxides such as propylene oxide and/or ethylene oxide, and secondary-tertiary amines (German Offenlegungsschrift No. 2,732,292).

Silamines having carbon-silicon bonds such as the compounds described e.g. in German Pat. No. 1,229,290 (U.S. Pat. No. 3,620,984) may also be used as catalysts, e.g. 2,2,4-trimethyl-2-silamorpholine and 1,3-diethylaminomethyl-tetramethyl-disiloxane.

Basic nitrogen compounds such as tetraalkylammonium hydroxides, alkali metal hydroxides (such as sodium hydroxide), alkali metal phenolates (such as sodium phenolate) and alkali metal alcoholates (such as sodium methylate) may also be used as catalysts. Hexahydrotriazines are also suitable catalysts (German Offenlegungsschrift No. 1,769,043).

The reaction between isocyanate groups and Zerewitinoff active hydrogen atoms is also powerfully accelerated by lactams and azalactams. An associate is first formed between the lactam and the compound which has the acidic hydrogen atom. Such associates and their catalytic activity are described in German Offenlegungsschriften Nos. 2,062,288, 2,062,289, 2,117,576 (U.S. Pat. Nos. 3,758,444), 2,129,198, 2,330,175 and 2,330,211.

Organometallic compounds may also be used as catalysts according to the present invention, in particular organo-tin compounds. Apart from organo-tin compounds which contain sulfur, such as di-n-octyl-tin-mercaptide (German Auslegeschrift No. 1,763,367 and U.S. Pat. No. 3,645,927), the organo-tin compounds used are preferably tin (II) salts of carboxylic acids (such as tin (II) acetate, tin (II) octoate, tin (II) ethylhexoate and tin (II) laurate) and the tin (IV) compounds (e.g. dibutyl tin oxide, dibutyl tin dichloride, dibutyl tin diacetate, dibutyl tin dilaurate, dibutyl tin maleate or dioctyl tin diacetate).

Any of the above-mentioned catalysts may, of course, also be used as mixtures. Combinations of organic metal compounds and amidines, aminopyridines or hydrazinopyridines are of particular interest (German Offenlegungsschriften Nos. 2,434,185, 2,601,082 and 2,603,834).

Other representatives of catalysts which may be used according to the present invention and details concerning the activity of these catalysts are given in Kunststoff-Handbuch, Volume VII, published by Vieweg and Höchtlen, Carl-Hanser-Verlag, Munich 1966, e.g. on pages 96 to 102.

The catalysts are generally used in a quantity ranging from about 0.001 to 10% by weight, based on the total quantity of compounds which have at least two isocyanate reactive hydrogen atoms.

Surface-active additives such as emulsifiers and foam stabilizers may also be present. Suitable emulsifiers include e.g. the sodium salts of ricinoleic sulfonates and salts of fatty acids with amines, such as oleic acid diethylamine or stearic acid diethanolamine. Alkali metal and ammonium salts of sulfonic acids (such as dodecylbenzene sulfonic acid or dinaphthylmethane disulfonic acid), of fatty acids (such as ricinoleic acid) or of polymeric fatty acids may also be included as surface-active additives.

Reaction retarders, e.g. compounds which are acid in reaction (such as hydrochloric acid or organic acid halides), known cell regulators (such as paraffins or fatty alcohols), dimethylpolysiloxanes, pigments of dyes, known flame retarding agents (such as trischloroethylphosphate, tricresylphosphate or ammonium phosphate and polyphosphate), stabilizers against ageing and weathering, plasticizers, fungistatic and bacteriostatic substances and fillers (such as barium sulfate, kieselguhr, carbon black or whiting).

Other examples of surface-active additives, reaction retarders, stabilizers, flame retarding substances, plasticizers, dyes, fillers and fungistatic and bacteriostatic substances which may also be used according to the present invention and details concerning their use and mode of action may be found in Kunststoff-Handbuch, Volume VII, published by Vieweg and Höchtlen, Carl-Hanser-Verlag, Munich 1966, e.g. on pages 103 to 113.

Method of carrying out the process according to the present invention:

The reactants are reacted together according to the present invention by the known casting process, often using mechanical devices, e.g. those described in U.S. Patent No. 2,764,565. Details concerning processing apparatus which may also be used according to the invention are given in Kunststoff-Handbuch, Volume VII, published by Vieweg and Höchtlen, Carl-Hanser-Verlag, Munich 1966.

The elastomers having urethane groups prepared by the process according to the present invention may be used as commercial products, especially as tires or tire components (e.g. as tread surface, ford cups, seals, cone belts, mats). They can advantageously replace rubber in many of its fields of application.

EXAMPLE 1 (Comparison)

(A) 100 Parts by weight of a prepolymer mixture (isocyanate content 4.06%) consisting of 80 parts by weight of a prepolymer prepared from a linear polypropylene glycol polyether having a molecular weight of 2000 (OH number 56) and 2,4-tolylene diisocyanate and 20 parts by weight of a prepolymer prepared from a linear polypropylene glycol polyether having a molecular weight of 1000 (OH number 112) and 2,4-tolylene diisocyanate are mixed at 70° C. with a mixture (B) consisting of 25 parts by weight of a liquid polybutadienol (polybd R 45 HT of Arco) and 5.82 parts by weight of a commercial mixture of diethyltolylene diamine.

(C) The reactive mixture is poured into a preheated open mold, removed from the mold after less than 5 minutes, heated at 130° C. for 30 minutes and then tempered at 80° C. for 4 hours.

The mechanical data of the molded products are summarized in Table 1.

EXAMPLE 2

0.6 g of $S_8$-sulfur and 0.28 g of zinc-N-diethyl-dithiocarbamate [Vulkacit LDA, Bayer AG] in a very finely divided form are added to 100 parts by weight of the prepolymer mixture described under Example 1(A), and the resulting mixture is worked up into a molded product as described in Examples 1(B) and 1(C).

EXAMPLE 3

1.7 g of $S_8$-sulfur and 0.28 g of zinc-N-diethyl-dithiocarbamate [Vulkacit LDA, Bayer AG] are added in a very finely divided form to 100 parts by weight of the prepolymer mixture described under Example 1(A), and the resulting mixture is worked up into a molded product according to the method of Examples 1(B) and 1(C).

EXAMPLE 4

10 g of carbon black (Printex V of Degussa) are incorporated with 100 parts by weight of the mixture described under Example 1(A) and 0.6 g of $S_8$-sulfur and 0.28 g of zinc-N-diethyl-dithiocarbamate [Vulkacit LDA Bayer AG] are added in a very finely divided form. The mixture is worked up into a molded product according to the method of Examples 1(B) and 1(C).

EXAMPLE 5

In 100 g of a prepolymer (NCO-content 3,27% by weight), prepared from a linear polypropyleneglycol-polyether having a molecular weight of 4000 (OH-number 28), 90% by weight of the OH groups of this polyether being primary OH groups, and from a mixture consisting of 50% by weight of 4,4'-diphenylmethane diisocyanate and 50% by weight of 2,4'-diphenylmethane diisocyanate, are 0,3 g sulfur and 1,12 g zinc-N-diethyl-dithiocarbamate (Vulkacit LDA, Bayer AG) incorporated in very finely divided form.

To this mixture 12,5 g of a liquid polybutadienol (poly bd R 45 HT of Arco) and 8,4 g of 4-methyl-3,5-diaminobenzoic-acid-2-ethylhexylester are added.

The reactive mixture obtained is worked up into a molded product according to the method of Example 1 C.

EXAMPLE 6

The prepolymer described in Example 5 (together with the vulcanization agents mentioned there) is mixed with 12,5 g of a liquid polybutadienol (poly bd R 45 HT of Arco) and 10,2 g of a condensation product obtained from formaldehyde and 2,6-diethyl aniline and 2,6-diisopropylaniline (molar ratio of these amines 1:1-average molecular weight of the condensation product 338).

The reactive mixture is worked up into a molded product according to the method of Example 1 C.

TABLE 1

| | Mechanical properties of the elastomers obtained according to the Examples | | | | |
|---|---|---|---|---|---|
| Example No. | Tension Test | | DIN 53 504 | | Tear Propagation Test |
| | δ100% [MPa] | δ300% [MPa] | δB [MPa] | εB [%] | DIN 53 515 [KN/M] |
| 1 | 1.9 | 2.3 | 2.6 | 760 | 15.6 |
| 2 | 2.1 | 3.25 | 15.0 | 870 | 14.4 |
| 3 | 2.1 | 3.2 | 9.9 | 740 | 15.5 |
| 4 | 2.1 | 3.4 | 12.1 | 620 | 16.3 |
| 5 | 2.7 | 4.5 | 12.1 | 820 | 20.3 |

TABLE 1-continued

Mechanical properties of the elastomers obtained according to the Examples

| 6 | 3.0 | 5.3 | 15.3 | 850 | 22.5 |
| --- | --- | --- | --- | --- | --- |

| Example No. | Abrasion DIN 53 516 [mm$^3$] | Density g/cm$^3$ | Shore A hardness |
| --- | --- | --- | --- |
| 1 | 125 | 1.035 | 60 |
| 2 | 24 | 1.035 | 58 |
| 3 | 59 | 1.025 | 62 |
| 4 | 61 | 1.035 | 74 |
| 5 | 62 | 1.035 | 70 |
| 6 | 57 | 1.030 | 75 |

What is claimed is:

1. A process for the production of vulcanized elastomers containing urethane groups by casting, comprising:
   (A) mixing the following components:
      (1) liquid diene polymers containing isocyanate reactive functional groups, having an average functionality of 2 to 3 and an average molecular weight of from 500 to 30,000,
      (2) compounds having molecular weights of from 400 to 10,000, and containing at least two hydroxyl groups,
      (3) polyisocyanates,
      (4) 3 to 30% by weight, based on 100 parts by weight of components (1)+(2), cross-linking agents having molecular weights of from 32 to 400 and containing at least two active hydrogen atoms,
      (5) vulcanization agents used for vulcanization and optionally
      (6) reinforcing fillers; and subsequently
   (B) pouring the mixture into a mold and allowing the mixture to react in the mold; and subsequently removing the molded product and
   (C) vulcanizing outside the mold at temperatures above 120° C.

2. The process of claim 1, wherein the mixture contains 20 to 80 parts by weight of component (1) and 80 to 20 parts by weight of component (2), based on the sum of components (1) and (2).

3. The process of claim 2, wherein the mixture contains 20 to 60 parts by weight of component (1) and 80 to 40 parts by weight of component (2), based on the sum of components (1) and (2).

4. The process of claim 1, wherein component (4) is used in quantities of from 5 to 20% by weight, based on 100 parts by weight of components (1)+(2).

5. The process of claim 1, wherein said liquid diene polymer has an average molecular weight of from 1,000 to 10,000.

6. The process of claim 1 wherein the functional group of said liquid diene polymer is a carboxyl, amino, thiol and/or hydroxyl group or a halogen atom.

7. The process of claim 1, wherein said diene polymers are polybutadienols or copolymers of styrene and/or acrylonitrile with butadiene.

8. The process of claim 1, wherein component (2) has a molecular weight of from 1,000 to 8,000 and contain 2 to 8 hydroxyl groups.

9. The process of claim 1, wherein said polyisocyanates are used in the form of isocyanate group-containing prepolymers with said compounds having molecular weights of from 400 to 10,000 which contain at least two hydroxyl groups.

10. The process of claim 1, wherein said cross-linking agents are diamines or polyamines.

11. The process of claim 10 wherein said cross-linking agents are aromatic diamines.

12. The process of claim 1 wherein said reinforcing fillers are carbon black, silica and glass and wherein plasticizers and extender oils are added.

13. Tires and tire components such as tread surface strips and/or side parts as well as retreaded tires, comprising vulcanized elastomers containing urethane groups prepared by casting, comprising:
   (A) mixing the following components:
      (1) liquid diene polymers containing isocyanate reactive functional groups,
      (2) compounds having molecular weights of from 400 to 10,000, and containing at least two hydroxyl groups,
      (3) polyisocyanates,
      (4) cross-linking agents having molecular weights of from 32 to 400 and containing at least two active hydrogen atoms,
      (5) vulcanization agents used for vulcanization and optionally
      (6) reinforcing fillers; and subsequently
   (B) pouring the mixture into a mold and allowing the mixture to react in the mold; and subsequently
   (C) vulcanizing the molded product at temperatures above 120° C.

* * * * *